United States Patent
Tolstoy et al.

(10) Patent No.: US 11,281,550 B2
(45) Date of Patent: *Mar. 22, 2022

(54) DISASTER RECOVERY SPECIFIC CONFIGURATIONS, MANAGEMENT, AND APPLICATION

(71) Applicant: EMC IP Holding Company LLC, Hopkinton, MA (US)

(72) Inventors: Mikhail Tolstoy, Saint Petersburg (RU); Roman Kupriyanov, Saint Petersburg (RU); Karyn Kelley, Peabody, MA (US); Larry McCloskey, Billerica, MA (US); Igor Matveevskiy, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/688,812

(22) Filed: Nov. 19, 2019

(65) Prior Publication Data
US 2020/0089587 A1    Mar. 19, 2020

Related U.S. Application Data

(63) Continuation of application No. 15/640,056, filed on Jun. 30, 2017, now Pat. No. 10,514,992.

(51) Int. Cl.
| | |
|---|---|
| *G06F 11/00* | (2006.01) |
| *G06F 11/20* | (2006.01) |
| *G06F 3/06* | (2006.01) |
| *G06F 11/07* | (2006.01) |

(52) U.S. Cl.
CPC ........ *G06F 11/2094* (2013.01); *G06F 3/0604* (2013.01); *G06F 3/0631* (2013.01); *G06F 3/0686* (2013.01); *G06F 11/0727* (2013.01); *G06F 11/2023* (2013.01); *G06F 11/2053* (2013.01); *G06F 2201/805* (2013.01); *G06F 2201/825* (2013.01)

(58) Field of Classification Search
CPC ............. G06F 11/2094; G06F 11/0727; G06F 11/073; G06F 11/1448; G06F 11/2017; G06F 11/2023; G06F 11/2053; G06F 11/2069; G06F 3/0604; G06F 3/0631; G06F 3/0686; G06F 2201/805; G06F 2201/825
See application file for complete search history.

(56) References Cited

U.S. PATENT DOCUMENTS

| | | | |
|---|---|---|---|
| 7,162,604 B1 | 1/2007 | Nourmohamadian et al. |
| 7,302,540 B1 | 11/2007 | Holdman et al. |
| 7,620,765 B1 | 11/2009 | Ohr et al. |

(Continued)

*Primary Examiner* — Joseph D Manoskey
(74) *Attorney, Agent, or Firm* — Chamberlain, Hrdlicka, White, Williams & Aughtry

(57) ABSTRACT

A mechanism for disaster recovery configurations and management in virtual tape applications. Specifically, the introduction of an additional computer process executing at an active datacenter site and at another active (or alternatively, a standby) datacenter site permit: (i) the generation and management of global configurations implemented on the active datacenter site prior to the occurrence of a failover event; and (ii) the implementation of global configurations on the another active (or standby) datacenter site after the occurrence of the failover event.

16 Claims, 11 Drawing Sheets

(56) References Cited

U.S. PATENT DOCUMENTS

| | | |
|---|---|---|
| 8,291,183 B2 | 10/2012 | McCloskey et al. |
| 8,458,422 B1 | 6/2013 | Holdman et al. |
| 8,667,239 B1 | 3/2014 | McCloskey et al. |
| 8,775,756 B1 | 7/2014 | McCloskey et al. |
| 8,793,452 B1 | 7/2014 | McCloskey et al. |
| 8,924,682 B1 | 12/2014 | McCloskey et al. |
| 9,009,443 B2 | 4/2015 | Haustein et al. |
| 9,207,877 B1 | 12/2015 | McCloskey |
| 9,436,591 B1 | 9/2016 | McCloskey et al. |
| 9,471,233 B1 | 10/2016 | Goodwin-Jette et al. |
| 9,552,370 B1 | 1/2017 | McCloskey et al. |
| 9,582,207 B1 | 2/2017 | McCloskey |
| 10,126,969 B1 | 11/2018 | Tolstoy et al. |
| 2004/0034811 A1 | 2/2004 | Trimmer et al. |
| 2005/0033911 A1 | 2/2005 | Kitamura et al. |
| 2005/0066116 A1* | 3/2005 | Bello ............... G06F 3/065 711/111 |
| 2005/0081077 A1* | 4/2005 | Luciani ........... G06F 11/1441 714/2 |
| 2006/0123208 A1 | 6/2006 | Johnson |
| 2007/0103984 A1 | 5/2007 | Kavuri et al. |
| 2008/0162813 A1 | 7/2008 | Haustein et al. |
| 2008/0222344 A1 | 9/2008 | Upadhyayula |
| 2008/0301363 A1 | 12/2008 | Kitamura et al. |
| 2010/0086135 A1 | 4/2010 | Wideman et al. |
| 2010/0185813 A1 | 7/2010 | Muroyama |
| 2012/0198146 A1 | 8/2012 | Hostetter et al. |
| 2012/0284555 A1 | 11/2012 | Akirav et al. |
| 2014/0136892 A1 | 5/2014 | Wu |
| 2014/0181395 A1* | 6/2014 | Vincent ........... G06F 11/1456 711/111 |
| 2014/0355148 A1 | 12/2014 | Ralphs |
| 2015/0154085 A1 | 6/2015 | Iwasaki et al. |

* cited by examiner

DISASTER RECOVERY SPECIFIC CONFIGURATIONS, MANAGEMENT, AND APPLICATION

BACKGROUND

Virtual tape disaster mitigation, by way of the updating and transfer of disaster recovery configurations, is presently a manual operation, which is error prone, slow, expensive, and disruptive.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-7, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements In general, embodiments of the invention relate to disaster recovery configurations and management for virtual tape applications. Specifically, one or more embodiments of the invention entail the introduction of an additional computer process executing at an active datacenter site and at another active (or alternatively, a standby) datacenter site. This additional computer process is dedicated towards: (i) the generation and management of global configurations implemented on the active datacenter site prior to the occurrence of a failover event; and (ii) the implementation of global configurations on the another active (or standby) datacenter site after the occurrence of the failover event.

Figure 1:
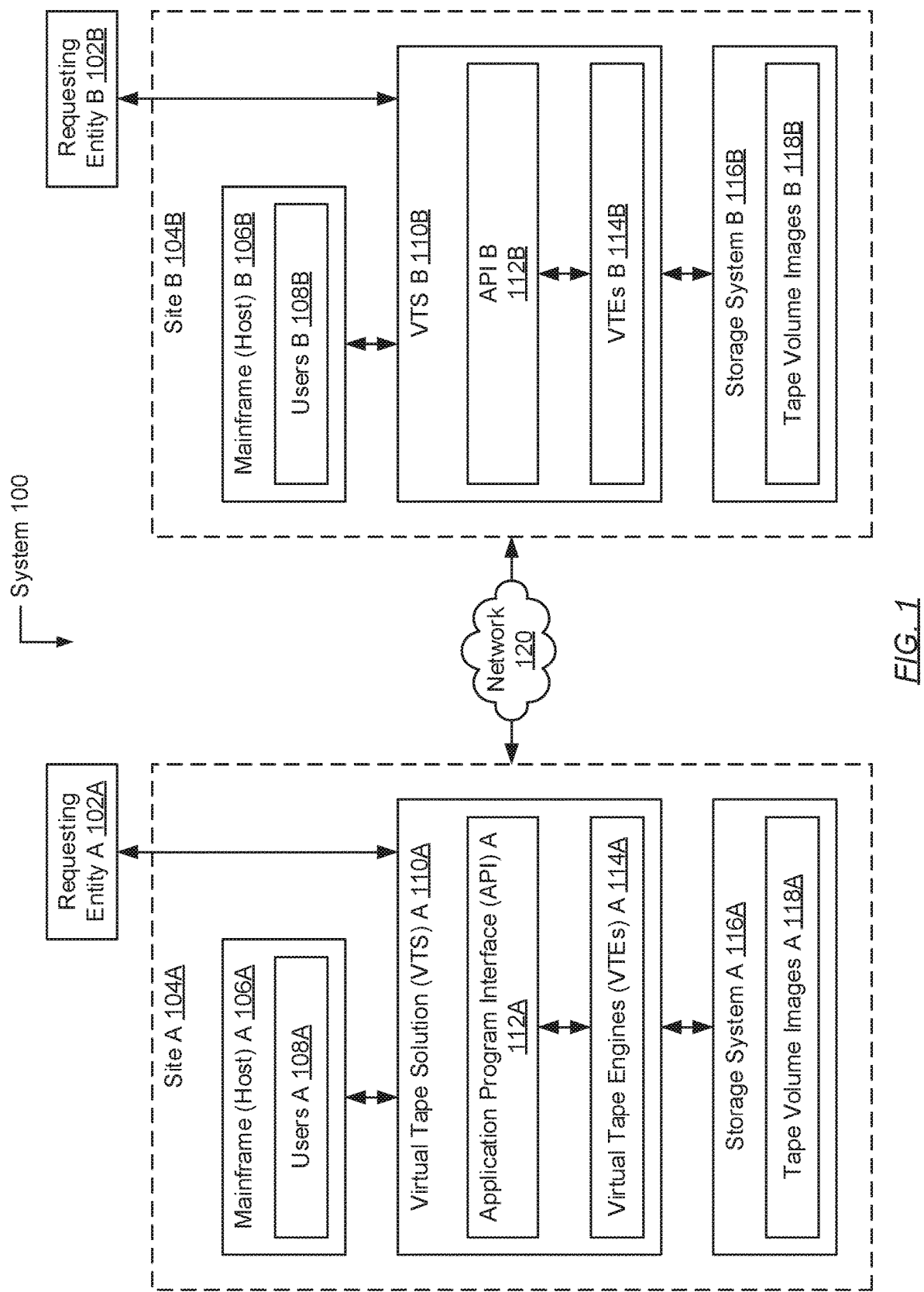
FIG. 1 shows a system in accordance with one or more embodiments of the invention.

FIG. 1 shows a system in accordance with one or more embodiments of the invention. The system (100) includes a first datacenter site (104A) operatively connected to a second datacenter site (104B) through a network (120). Each datacenter site (104A, 104B) includes a virtual tape solution (VTS) (110A, 110B) operatively connected to a mainframe (106A, 106B), a requesting entity (102A, 102B), and a storage system (116A, 116B). Each of these components is described below.

In one embodiment of the invention, the aforementioned components may be directly or indirectly connected to each other using any combination of wired or wireless connections. In embodiments in which the aforementioned components are indirectly connected to one another, there may be other network infrastructure components or systems (e.g., switches, routers, servers, etc.) (e.g., the network (120)) that facilitate communication between the aforementioned components. Moreover, the aforementioned components may communicate with each other using any combination of wired and/or wireless communication protocols.

In one embodiment of the invention, the VTS (110A, 110B) may be a disk-based data backup and archiving platform for the mainframe (106A, 106B). The VTS (110A, 110B) may include an application program interface (API) (112A, 112B) and a set of one or more virtual tape engines (VTEs) (114A, 114B). In one embodiment of the invention, the API (112A, 112B) may provide a specification for the exchange of information between the VTS (110A, 110B) and the requesting entity (102A, 102B), or the VTS (110A, 110B) and the mainframe (106A, 106B). For example, the API (112A, 112B) may establish that the exchange of information entails a request for processing and a return of a response based on the outcome of the processing. In one embodiment of the invention, the API (112A, 112B) may include logic dedicated towards the delegation of received requests to an appropriate VTE of the set of VTEs (114A, 114B). To that end, the API (112A, 112B) may include functionality to search and update locally-stored data structures (not shown), which may be used to store/map which VTE of the set of VTEs (114A, 114B) is emulating which tape drive and/or defining which tape library (see e.g., FIG. 3). Additionally, the API (112A, 112B) may include further functionality to mitigate failover events occurring at a remote datacenter site (104A, 104B) (see e.g., FIGS. 4-5D). Further, the API (112A, 112B) may be implemented using hardware, software, firmware, or any combination thereof. By way of one example, the API (112A, 112B) may be a web API accessed through a webpage and a wide area network (WAN) (or Internet) connection. The API (112A, 112B) is described in further detail below with respect to FIG. 2.

In one embodiment of the invention, a VTE of the set of VTEs (114A, 114B) may be a server on which one or more tape drives (described below) may be emulated and one or more tape libraries (described below) may be defined. Specifically, a VTE of the set of VTEs (114A, 114B) may be a physical computing system programmed to: (i) receive and process requests concerning tape drives and/or tape libraries; (ii) add, remove, or re-configure one or more tape drives or tape libraries non-disruptively based on the requests; and (iii) generate and send responses to the requests based on the outcome of their processing. In one embodiment of the invention, the addition, removal, and/or reconfiguration of tape drives and/or tape libraries non-disruptively may refer to the performance of such actions without requiring the shutdown and restarting of the VTS (110A, 110B). VTEs (114A, 114B) are described in further detail below with respect to FIG. 3.

In one embodiment of the invention, the mainframe (106A, 106B) may be any computing system (see e.g., FIG. 7) used for various applications. These applications may, for example, require large-scale and complex data processing. Further, the mainframe (106A, 106B) may be any computing system that may serve multiple users (108A, 108B) concurrently. The mainframe (106A, 106B) may be programmed to provide and manage the allocation of computing resources for use by the various executing processes (e.g., tasks) instantiated by the one or more users (108A, 108B). Further, the mainframe (106A, 106B) may include functionality to submit input/output (I/O) requests to the VTS (110A, 110B). The I/O requests may include, but are not limited to, requests to write data to a virtual tape drive (not shown) and requests to read data from the virtual tape drive.

In one embodiment of the invention, the requesting entity (102A, 102B) may be any type of computing system (see e.g., FIG. 7) programmed to interact with the VTS (110A, 110B). Specifically, the requesting entity (102A, 102B) may include functionality to: (i) submit requests concerning one or more tape drives and/or tape libraries to the VTS (110A, 110B); and (ii) receive responses, from the VTS (110A, 110B), based on the outcome of the processing of the requests. In one embodiment of the invention, the first requesting entity (102A) may be different to the second requesting entity (102B). In another embodiment of the invention, the first and second requesting entities (102A, 102B) may be a common requesting entity. By way of examples, the requesting entity (102A, 102B) may be a desktop computer, a laptop computer, a smartphone, or a tablet computer operated by a network, datacenter, and/or mainframe administrator.

In one embodiment of the invention, the storage system (116A, 116B) may be a back-end data repository implemented using any type of storage unit and/or device (e.g., a file system, database, collection of tables, or any other storage mechanism). The storage system (116A, 116B) may be implemented using multiple storage units and/or devices, which may or may not be of the same type or located at the same physical site. In one embodiment of the invention, the storage system (116A, 116B) includes functionality to store a set of one or more tape volume images (118A, 118B). A tape volume image of the set of tape volume images (118A, 118B) may represent, for example, a single file in a file system, or a single record in a database. Further, each tape volume image of the set of tape volume images (118A, 118B) may cache short-retention data and/or consolidate long-retention data used and/or generated by the various processes (e.g., tasks) which may be executing on the mainframe (106A, 106B). In one embodiment of the invention, the storage system (116A, 116B) may include functionality to manipulate the storage of the set of tape volume images (118A, 118B) by way of providing, for example, the deduplication, compression, encryption, etc., of data. In one embodiment of the invention, the storage system (116A, 116B) includes persistent storage (not shown). Examples of persistent storage hosted on the storage system (116A, 116B) include, but are not limited to, optical storage, magnetic storage, NAND Flash memory, NOR Flash memory, Magnetic RAM memory (M-RAM), Spin Torque Magnetic RAM memory (ST-MRAM), Phase Change memory (PCM), and any other memory defined as a non-volatile Storage Class memory (SCM).

While FIG. 1 shows a configuration of components, other system configurations may be used without departing from the scope of the invention.

Figure 2:
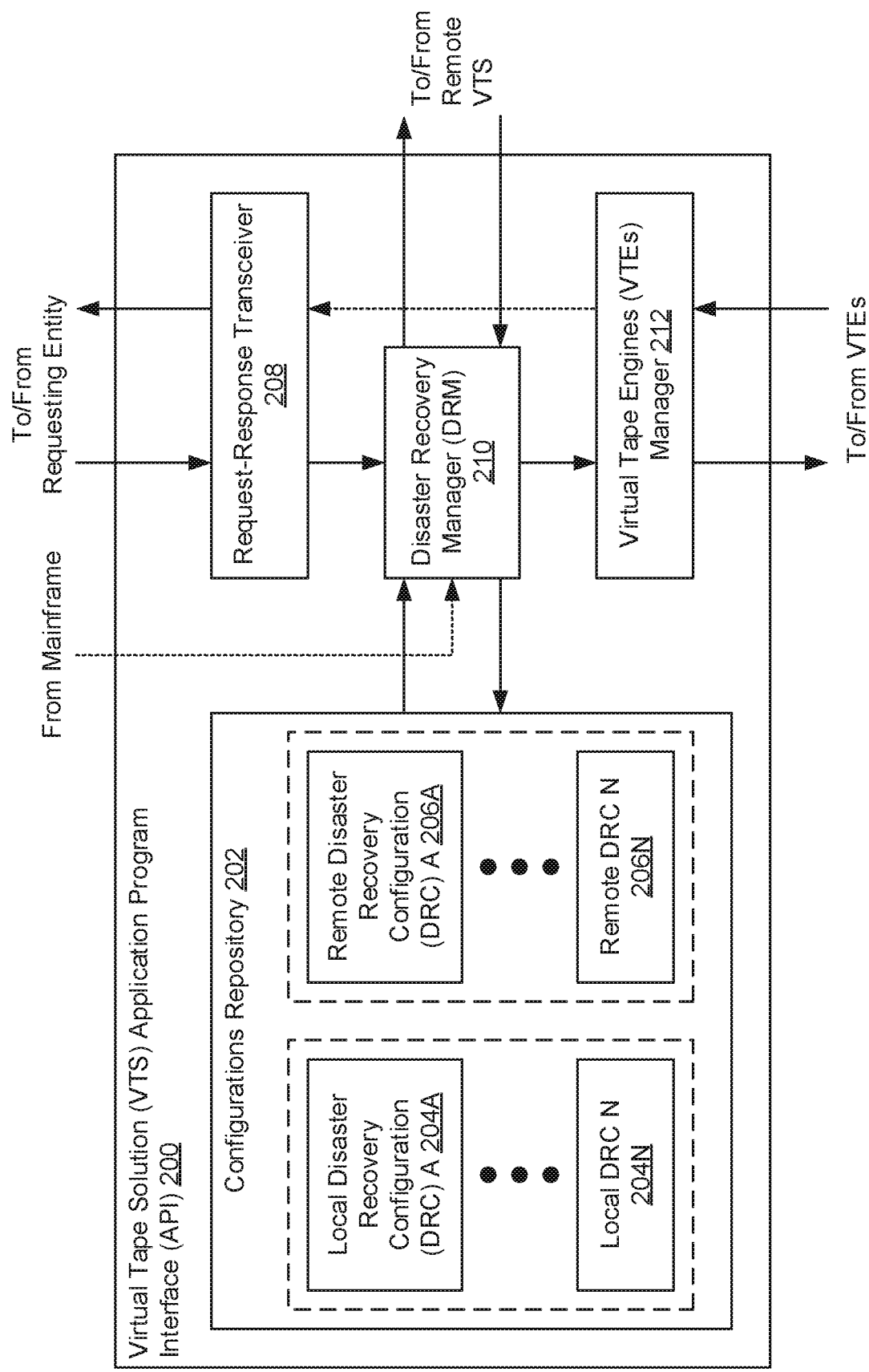
FIG. 2 shows a virtual tape solution application program interface in accordance with one or more embodiments of the invention.

FIG. 2 shows a virtual tape solution (VTS) application program interface (API) in accordance with one or more embodiments of the invention. The VTS API (200) includes a configurations repository (202), a request-response transceiver (208), a disaster recovery manager (DRM) (210), and a VTEs manager (212). Each of these components is described below.

In one embodiment of the invention, the configurations repository (202) may be any type of storage unit and/or device (e.g., a file system, a database, a collection of tables, or any other storage mechanism) for storing data. Further, the configurations repository (202) may include different storage units and/or devices. In one embodiment of the invention, the configurations repository (202) includes functionality to store disaster recovery configurations (DRCs). A DRC may be a script, expressed in computer readable program code, that captures a snapshot of the global configuration implemented on the VTS at a given time. In one embodiment of the invention, a global configuration may outline the one or more user configurations implemented on each VTE of the VTS at the given time.

In one embodiment of the invention, each user configuration may also be a script, also expressed in computer readable program code, which specifies VTE computing resources allocated to (or required by) a mainframe user to support the execution of various processes (i.e., tasks) instantiated by the mainframe user on the mainframe. VTE computing resources specified in a user configuration may include, but are not limited to, a number of virtual tape drives and a number of virtual tape libraries allocated to the mainframe user associated with the user configuration. In one embodiment of the invention, a user configuration may further include a tape drive configuration (TDC) for each virtual tape drive the user configuration specifies. In such an embodiment, a TDC may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive. In one embodiment of the invention, a user configuration may further include library management information (LMI) for each virtual tape library the user configuration specifies. In such an embodiment, LMI may include, but is not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv)

metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored.

In one embodiment of the invention, the DRCs stored in the configurations repository (202) may be segregated into a first section (i.e., a local section) for storing local DRCs (204A-204N) and a second section (i.e., a remote section) for storing remote DRCs (206A-206N). A local DRC (204A-204N) may be a snapshot of the global configuration (described above) implemented on a local VTS at a given time, whereas a remote DRC (206A-206N) may be a snapshot of the global configuration implemented on a remote VTS at a given time. In one embodiment of the invention, identification of the local VTS versus the remote VTS may be a matter of perspective based on: (i) which VTS receives a request (e.g., a user request) from a requesting entity, generates a DRC based on the request, and shares the generated DRC with the other VTS; and (ii) which VTS receives the DRC from the other VTS for redundant storage. For example, and in reference to the system shown in FIG. 1: VTS A (110A) may be the local VTS when during the submitting of a request by the requesting entity (102A, 102B), VTS A (110A) receives the request and, subsequently, generates a DRC based on the received request (see e.g., FIG. 4). In this example, VTS A (110A) may then share the generated DRC with VTS B (110B) for redundant storage in case a failover event occurs at site A (104A). Accordingly, per this example, VTS B (110B), may be the remote VTS because the DRC is merely stored as a redundant copy in VTS B (110B), and not immediately implemented until a failover event occurs at site A (104A). By the same token, and by way of another example, VTS B (110B) may be the local VTS when VTS B (110B) receives the request, and subsequently, generates the DRC and shares the DRC with VTS A (110A) for redundant storage. VTS A (110A), the receiver of the DRC in this second example, may be identified as the remote VTS.

In one embodiment of the invention, the request-response transceiver (208) may be a computer process (or an instance of a computer program executing within the VTS API (200)). Specifically, the request-response transceiver (208) may be a computer process dedicated towards the exchange of information between the VTS and a requesting entity. With respect to information exchange, the request-response transceiver (208) includes functionality to: (i) receive user requests (or any other request) from the requesting entity; (ii) extract user configurations from the user requests; (iii) provide the extracted user configurations to the DRM (210); (iv) receive request reports, which outline the outcomes of the processing of user requests, from the VTEs manager (212); (v) generate user responses based on the received request reports and in a format recognizable/acceptable to the requesting entity; and (vi) transmit the generated user responses to the requesting entity.

In one embodiment of the invention, the DRM (210) may be a computer process (or an instance of a computer program executing within the VTS API (200)). Specifically, the DRM (210) may be a computer process dedicated towards failover event mitigation. With respect to failover event mitigation responsibilities on a local VTS (described above), the DRM (210) includes functionality to: (i) receive a user configuration from the request-response transceiver (208); (ii) generate a new DRC by updating a previously generated DRC to include configuration changes introduced by the received user configuration; (iii) store the newly generated DRC in the local section of the configurations repository (202); (iv) share/transmit the newly generated DRC with/to an operatively connected (i.e., remote) DRM executing within a remote VTS API of a remote VTS; and (v) delegate the received user configuration to the VTEs manager (212) for implementation. With respect to failover event mitigation responsibilities on a remote VTS (described above), the DRM (210) includes functionality to: (i) receive DRCs generated by another DRM; (ii) store the received DRCs in the remote section of the configurations repository (202); and in response to a failover event occurring at the site wherein the other DRM may be executing: (iii) receive a configuration override instruction from the locally connected mainframe (i.e., the mainframe residing in the same site wherein the DRM (210) is executing); (iv) as a result of the configuration override instruction, obtain a latest or most recently stored DRC from the remote section of the configurations repository (202); (v) segment the latest DRC to define a set of VTE specific configurations (VSCs), wherein each VSC represents a portion of the global VTS configuration that is to be implemented on one VTE of the set of VTEs forming the VTS; and (vi) delegate the set of VSCs to the VTEs manager (212) for implementation.

In one embodiment of the invention, the VTEs manager (212) may be a computer process (or an instance of a computer program executing within the VTS API (200)). Specifically, the VTEs manager (212) may be a computer process dedicated towards the exchange of information between the VTS API (200) and the set of one or more VTEs forming the VTS. With respect to information exchange occurring between itself and a VTE at a local VTS, the VTEs manager (212) includes functionality to: (i) receive a user configuration from the DRM (210); (ii) identify the VTE using a VTE ID enclosed in the user configuration; (iii) generate a set of library batch requests (LBRs) and a set of drive batch requests (DBRs) based on the user configuration; and (iv) submit the set of LBRs and the set of DBRs to the VTE (identified in (ii)) for implementation of the user configuration on the VTE. With respect to information exchange occurring between itself and all VTEs at a remote VTS, the VTEs manager (212) includes functionality to: (i) receive a set of VSCs from the DRM (210) after a failover event has occurred on the site wherein a local VTS resides; and for each VSC of the set of VSCs: (ii) identify the one VTE of the set of VTEs associated with the VSC based on a VTE ID enclosed in the VSC; (iii) generate a set of LBRs and a set of DBRs based on the VSC; and (iv) submit the set of LBRs and the set of DBRs to the one VTE (identified in (ii)) for implementation of the VSC (i.e., a set of user configurations) on the one VTE. The VTEs manager (212) may further include functionality to receive request reports (described above) issued by one or more VTEs, and subsequently, forward/relay the received request reports to the request-response transceiver (208).

Figure 3:
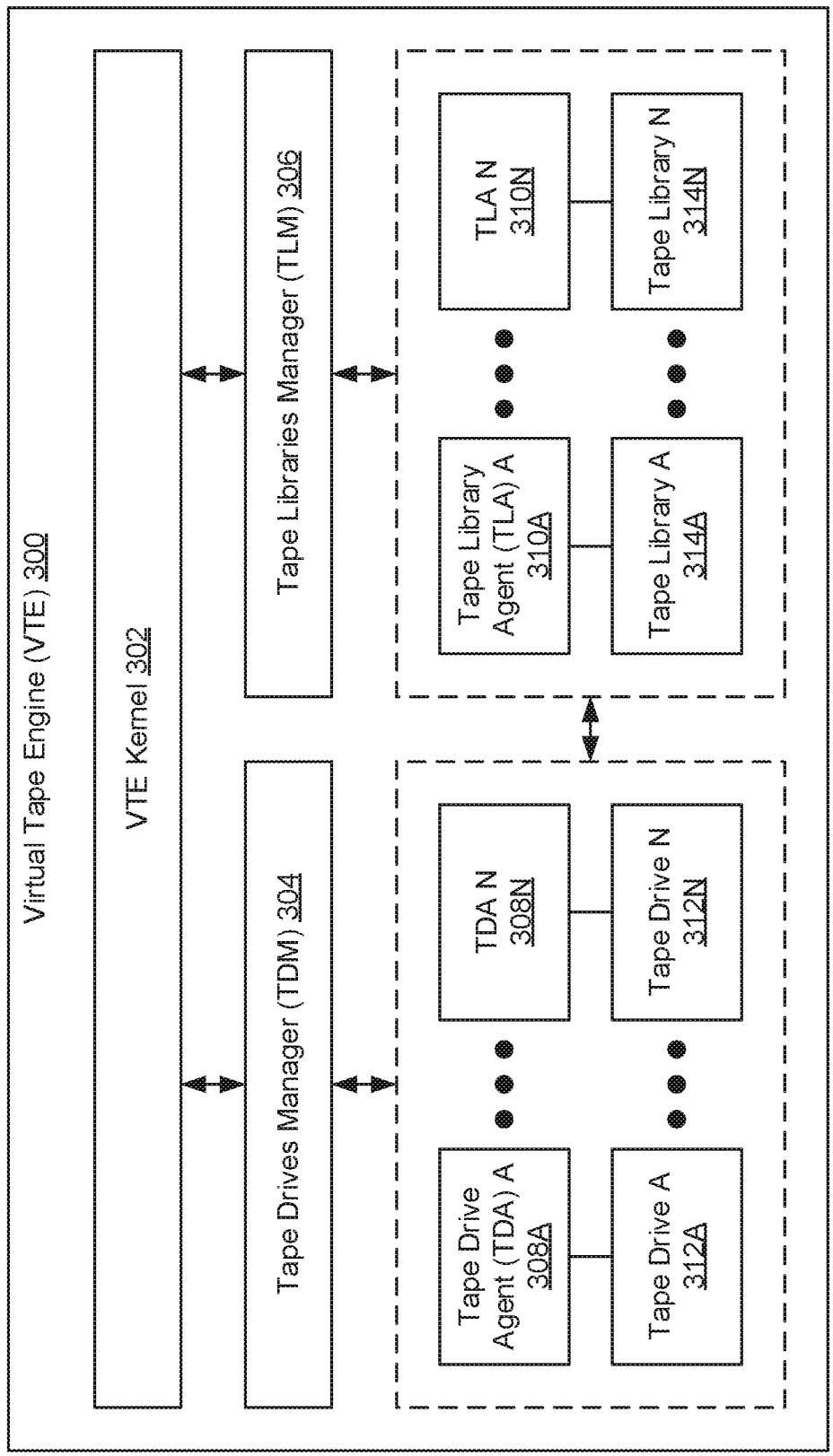
FIG. 3 shows a virtual tape engine in accordance with one or more embodiments of the invention.

FIG. 3 shows a virtual tape engine (VTE) in accordance with one or more embodiments of the invention. A VTE (300) includes a VTE kernel (302) operatively connected to a tape drives manager (TDM) (304) and a tape libraries manager (TLM) (306). The TDM (304) may be operatively connected to and responsible for one or more tape drive agents (TDAs) (308A-308N). Each TDA (308A-308N) may be operatively connected and responsible for one and only one emulated tape drive (312A-312N). Further, the TLM (306) may be operatively connected to and responsible for one or more tape library agents (TLAs) (310A-310N). Each TLA (310A-310N) may be operatively connected and responsible for one and only one tape library (314A-314N). Each of these components is described below.

In one embodiment of the invention, the VTE kernel (302) may be a core or central computer program executing on the VTE (300). The VTE kernel (302) includes functionality to: (i) receive and interpret LBRs/DBRs submitted by the VTS API; (ii) delegate DBRs, which pertain to the configuration of tape drives (312A-312N) to the TDM (304); (iii) delegate LBRs, which pertain to the configuration of tape libraries (314A-314N) to the TLM (306); and (iv) receive and relay request reports (i.e., indicating the outcome of the received DBRs or LBRs) from the TDM (304) or TLM (306) to the VTS API.

In one embodiment of the invention, the TDM (304) may be a computer process (or an instance of a computer program executing on the VTE (300)). Specifically, the TDM (304) may be a computer process dedicated towards the management of the one or more TDAs (308A-308N) which may be executing on the VTE (300). With respect to TDA management, the TDM (304) includes functionality to: (i) create and delete TDAs (308A-308N); (ii) create tape drives (312A-312N); (iii) assign TDAs (308A-308N) to tape drives (312A-312N); (iv) search and update the drive control table (DCT), which stores mappings identifying which TDA (308A-308N) may be managing which tape drive (312A-312N); (v) receive requests (i.e., DBRs) concerning the configuration (e.g., addition, removal, or modification) of one or more tape drives (312A-312N) which may be delegated from the VTE kernel (302); and (vi) generate and provide request reports, outlining the outcomes of the processed requests, to the VTE kernel (302).

In one embodiment of the invention, the TLM (306) may be a computer process (or an instance of a computer program executing on the VTE (300)). Specifically, the TLM (306) may be a computer process dedicated towards the management of the one or more TLAs (310A-310N) which may be executing on the VTE (300). With respect to TLA management, the TLM (206) includes functionality to: (i) create and delete TLAs (310A-310N); (ii) create tape libraries (314A-314N); (iii) assign TLAs (310A-310N) to tape libraries (314A-314N); (iv) search and update the library control table (LCT), which stores mappings identifying which TLA (310A-310N) may be managing which tape library (314A-314N); (v) receive requests (i.e., LBRs) concerning the configuration (e.g., addition, removal, or modification) of one or more tape libraries (314A-314N) which may be delegated from the VTE kernel (302); and (vi) generate and provide request reports, outlining the outcomes of the processed requests, to the VTE kernel (302).

In one embodiment of the invention, a TDA (308A-308N) may be a computer process (or an instance of a computer program executing on the VTE (300)). Specifically, a TDA (308A-308N) may be a computer process dedicated towards the management of one of the one or more tape drives (312A-312N) emulated on the VTE (300). With respect to tape drive management, a TDA (308A-308N) includes functionality to: (i) manage the life cycle of the manged tape drive (312A-312N); (ii) ready the managed tape drive (312A-312N) for deletion by (a) cleaning up the managed tape drive (312A-312N) and (b) setting a current usage state of the managed tape drive (312A-312N) to a dead state after the cleaning up (discussed below); and (iii) update the management information (i.e., at least a portion of a tape drive configuration (TDC)) associated with the managed tape drive (312A-312N).

In one embodiment of the invention, a TLA (310A-210N) may be a computer process (or an instance of a computer program executing on the VTE (300)). Specifically, a TLA (310A-310N) may be a computer process dedicated towards the management of one of the one or more tape libraries (314A-314N) defined on the VTE (300). With respect to tape library management, a TLA (310A-310N) includes functionality to: (i) manage the life cycle of the managed tape library (314A-314N); (ii) delete the managed tape library (314A-314N) in response to a shutdown command (discussed below); (iii) update the management information (i.e., at least a portion of library management information (LMI)) associated with the managed tape library (314A-314N).

In one embodiment of the invention, a tape drive (312A-312N) may be an emulation of physical tape hardware. Accordingly, a tape drive (312A-312N) may be a software construct (e.g., a virtual machine) that implements physical tape drive functionality. Physical tape drive functionality may include, but is not limited to, the reading and writing of data used and/or generated by the mainframe to the storage system (see e.g., FIG. 1).

In one embodiment of the invention, a tape library (314A-314N) may be a single file system within which one or more tape volume images (see e.g., FIG. 1) may be mounted. As a file system, a tape library (314A-314N) may store identifiers and/or address locations in memory or non-transitory computer readable media (e.g., the storage system (see e.g., FIG. 1)) within which data (i.e., tape volume images) may be consolidated.

Figure 4:
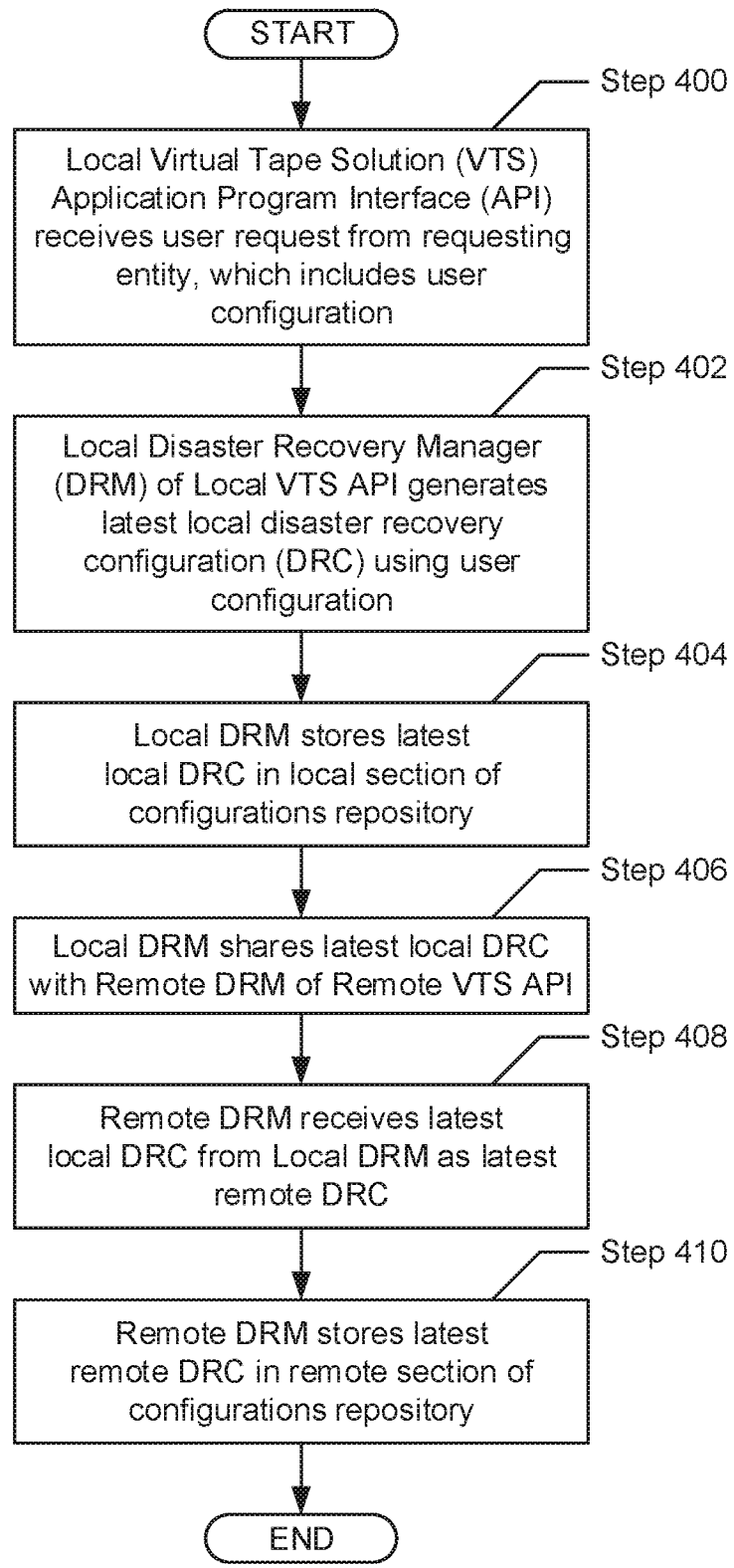
FIG. 4 shows a flowchart describing a method for generating a disaster recovery configuration in accordance with one or more embodiments of the invention.

FIG. 4 shows a flowchart describing a method for generating a disaster recovery configuration (DRC) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIG. 4 may be performed in parallel with any other steps shown in FIGS. 5A-5D without departing from the scope of the invention.

Turning to FIG. 4, in Step 400, the local VTS API, or more specifically, the local request-response transceiver executing within the local VTS API, receives a user request from a requesting entity. In one embodiment of the invention, the user request may pertain to the allocation of computing resources to support mainframe activities for a new mainframe user. In another embodiment of the invention, the user request may pertain to the reconfiguration of computing resources to support mainframe activities for an existing mainframe user. For either embodiment, the user request may include a user ID associated with the new/existing mainframe user and a user configuration (described above). Subsequently, the request-response transceiver may provide the contents of the user request (i.e., the user ID and the user configuration) to the local DRM executing within the local VTS API.

In Step 402, the local DRM generates a latest local DRC using the user configuration. In one embodiment of the invention, generation of the latest local DRC may entail the following steps: (i) obtaining the most recently stored local DRC from the local section of the configurations repository; (ii) duplicating the most recently stored local DRC; and (iii) applying the changes introduced by the user configuration (received in Step 400) to the duplicate most recently stored local DRC to generate the latest local DRC. In one embodiment of the invention, applying the changes introduced by the user configuration to the duplicate most recently stored local DRC may entail: (i) obtaining a VTE ID included in the user configuration; (ii) identifying one VTE of the set of VTEs associated with the VTE ID; (iii) performing a first search to identify the section (i.e., VTE section) in the duplicate most recently stored local DRC designated for the identified one VTE; (iv) (a) if associated with an existing user, using the user ID to perform a second search to identify the subsection within the VTE section designated for the existing mainframe user; or (b) if associated with a new user, creating and appending a new subsection within the VTE section designated for the new mainframe user; and (v) (a) if designated for an existing mainframe user, applying the contents (i.e., number of virtual tape drives, number of virtual tape libraries, set of LMI where cardinality for set of LMI equals the number of virtual tape libraries, set of TDC where cardinality for set of TDC equals the number of virtual tape drives, etc.) of the user configuration (received in Step 400) to replace the existing user configuration for the existing mainframe user specified in the duplicate most recently stored local DRC; or (b) if designated for a new user, applying the contents of the user configuration (received in Step 400) to the newly created subsection.

In Step 404, the local DRM stores the latest local DRC in the local section of the configurations repository. More specifically, in one embodiment of the invention, the local DRM stores the updated duplicate most recently stored local DRC as the latest local DRC. In Step 406, the local DRM shares or transmits the latest local DRC (generated in Step 402) with/to a remote DRM executing within a remote VTS API at a remote site. After sharing/transmitting the latest local DRC, the local DRM may submit the user ID and user configuration to the local VTEs manager for implementation. In Step 408, the remote DRM receives the latest local DRC from the local DRM. Finally, in Step 410, the remote DRM subsequently stores the latest local DRC as a latest remote DRC in the remote section of the configurations repository at the remote site, and the process ends.

FIGS. 5A-5D show flowcharts describing a method for configuring virtual tape engines (VTEs) using a disaster recovery configuration (DRC) in accordance with one or more embodiments of the invention. While the various steps in the flowcharts are presented and described sequentially, one of ordinary skill will appreciate that some or all steps may be executed in different orders, may be combined or omitted, and some or all steps may be executed in parallel. In one embodiment of the invention, the steps shown in FIGS. 5A-5D may be performed in parallel with any other steps shown in FIG. 4 without departing from the scope of the invention.

Figure 5A:
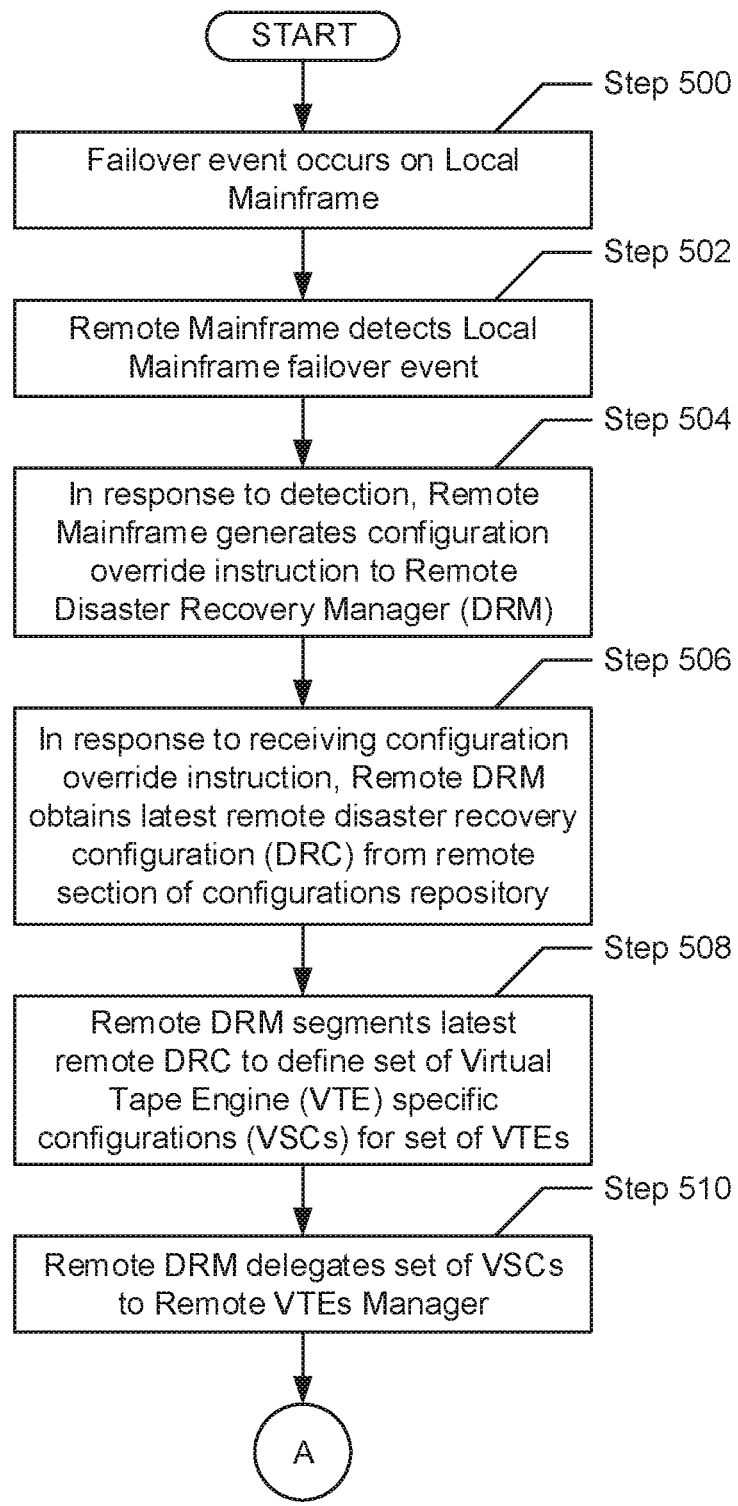
FIGS. 5A-5D show flowcharts describing a method for configuring virtual tape engines using a disaster recovery configuration in accordance with one or more embodiments of the invention.

Turning to FIG. 5A, in Step 500, a failover event occurs at a local site, or more specifically, on a local mainframe residing at the local site. In one embodiment of the invention, the failover event may be triggered by a failure of the local mainframe. In another embodiment of the invention, the failover event may be triggered by a scheduled downtime for maintenance of the local mainframe.

In Step 502, a remote mainframe detects the failover event occurring at the local mainframe. In one embodiment of the invention, detection of the failover event, by the remote mainframe, may be achieved by the lack of a heartbeat, associated with the local mainframe, reaching the remote mainframe. A heartbeat may be a periodic signal or message generated and transmitted by one mainframe (or any other component) to another mainframe (or any other component), which indicates normal operation. Thus, in not receiving one or more heartbeats from the local mainframe over a period of time, the remote mainframe may detect that a failover event has been triggered.

In Step 504, in response to detecting the failover event at the local mainframe, the remote mainframe generates a configuration override instruction. In one embodiment of the invention, the configuration override instruction may include a command directed to the remote DRM executing within the remote VTS API at the remote site. The command may instruct the remote DRM to override the existing global configuration on the remote VTS, if any, with the latest remote DRC (i.e., the latest local DRC that was implemented on the local VTS prior to the failover event).

In Step 506, in response to receiving the configuration override instruction from the remote mainframe, the remote DRM obtains the latest remote DRC. In one embodiment of the invention, the latest remote DRC may be retrieved from the remote section of the configurations repository associated with the remote site. Further, in one embodiment of the invention, identification of the latest remote DRC may be enabled by way of performing a search of the remote section of the configurations repository for a remote DRC associated with a most recent timestamp.

In Step 508, after obtaining the latest remote DRC, the remote DRM proceeds to segment the latest remote DRC to define a set of VSCs. In one embodiment of the invention, because a DRC is representative of the global configuration implemented on a VTS at a given time, and because a global configuration outlines the user configurations implemented on each VTE of the VTS at the given time, segmenting the latest remote DRC to define the set of VSCs may entail breaking up the latest remote DRC on a per VTE section (i.e., section of a DRC designated for each VTE) basis. Specifically, each VTE section specified in the latest remote DRC is segmented from the latest remote DRC to create/define each VSC of the set of VSCs. Further, as described above, in one embodiment of the invention, each VSC thus outlines a subset of the set of user configurations detailed in the global configuration. The aforementioned subset of user configurations may be representative of the latest specific set of user configurations that had been implemented on a corresponding local VTE at the local site prior to the failover event, which must be implemented on a corresponding remote VTE at the remote site. In Step 510, the remote DRM delegates the recently defined set of VSCs to the remote VTEs manager at the remote site.

Figure 5B:
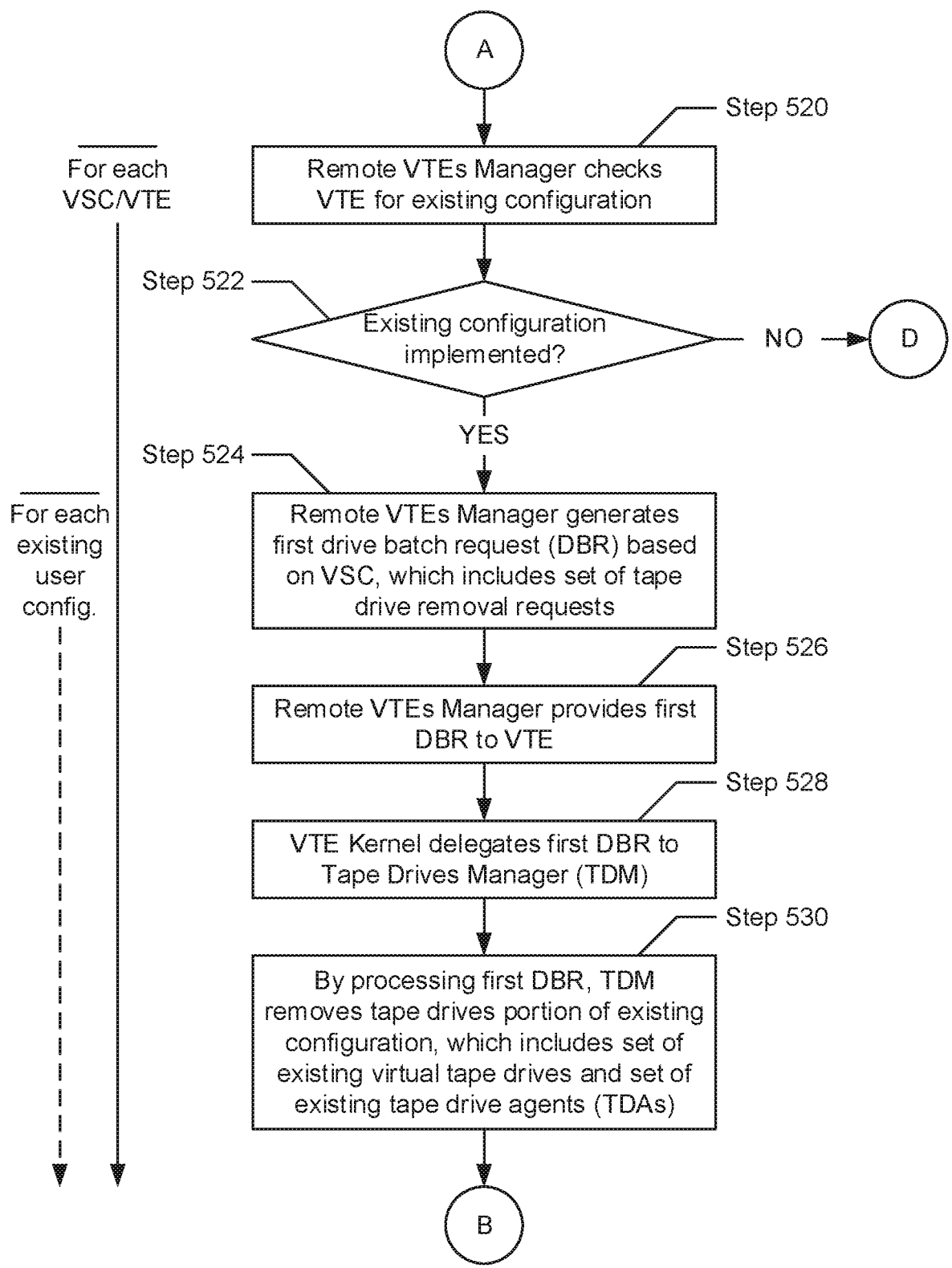
Figure 5C:
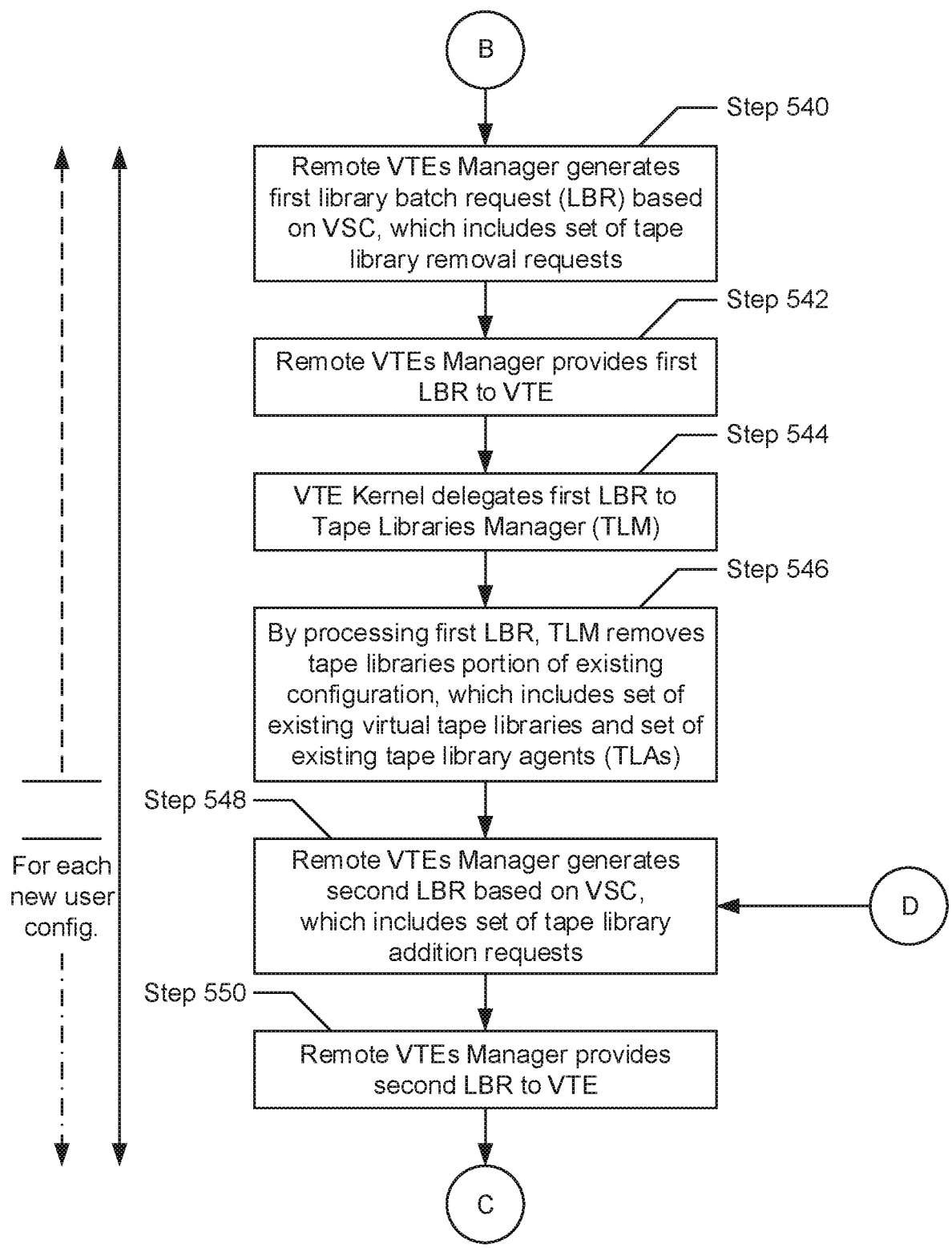
Figure 5D:
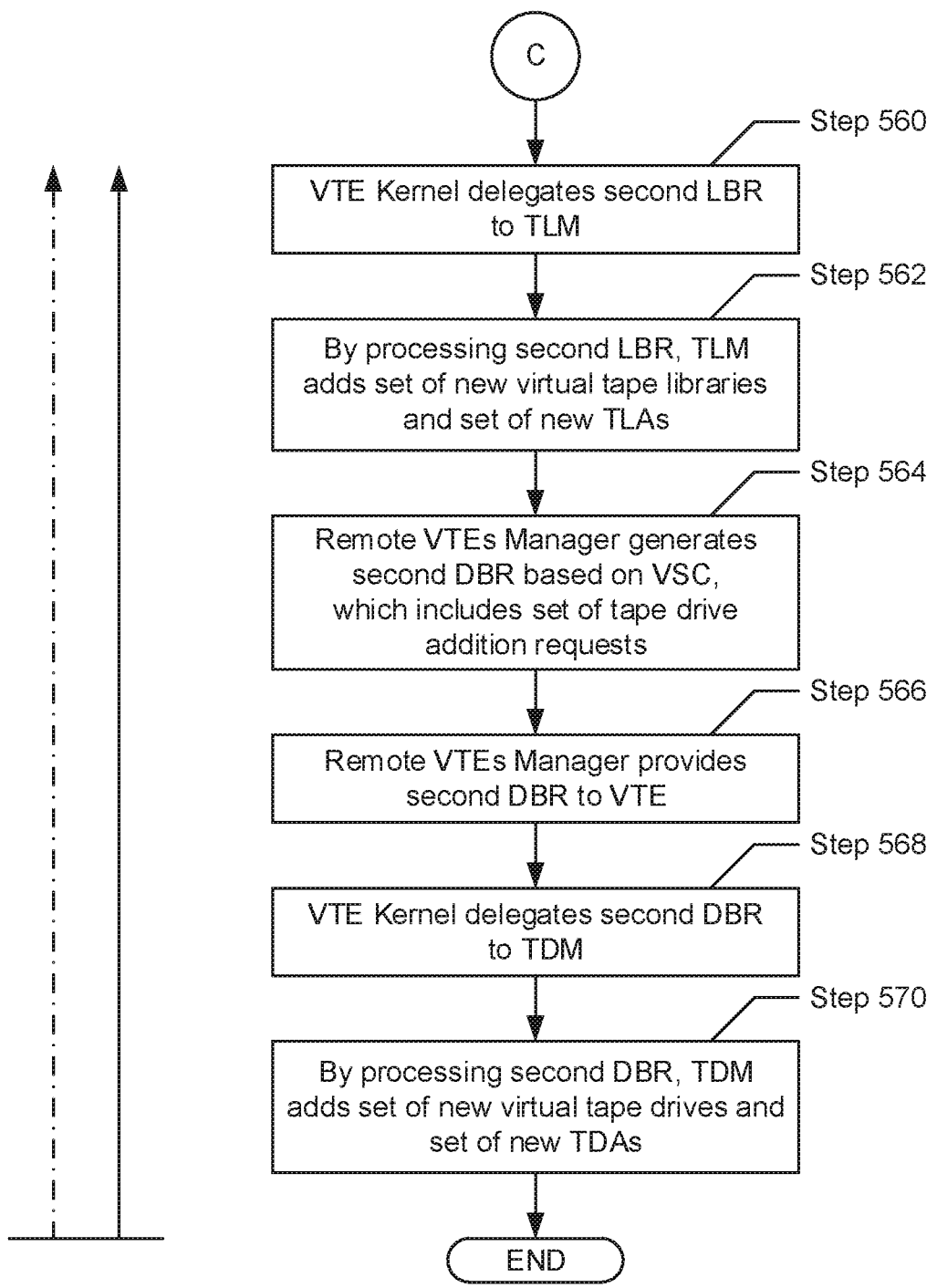

For the remaining steps described in FIGS. 5B-5D, each iteration of steps (i.e., Steps 520 through 570) may be performed for each VSC of the set of VSCs (defined in Step 508) directed to a remote VTE of the set of remote VTEs. Therefore, turning to FIG. 5B, in Step 520, after receiving the VSC from the remote DRM, the remote VTEs manager checks the appropriate remote VTE for the presence of an existing configuration. In one embodiment of the invention, the appropriate remote VTE may be identified and associated with the same VTE ID (associated with a corresponding local VTE) specified in the VSC. In another embodiment of the invention, the appropriate remote VTE may be identified by way of performing a lookup, using the VTE ID specified in the VSC, of a data structure, to identify another VTE ID associated with the appropriate remote VTE. In such an embodiment, the aforementioned data structure may be stored in persistent storage of the remote VTS, and may contain one or more entries, wherein each entry may include a mapping relating a VTE ID associated with a local VTE to a VTE ID associated with a remote VTE. In one embodiment of the invention, checking for the presence of an existing configuration on the remote VTE may entail determining whether a VTE section is specified/designated for the remote VTE in a latest local DRC, if any, that may be obtained (by the remote DRM and provided to the remote VTEs manager) from the local section of the configurations repository. In another embodiment of the invention, checking for the presence of an existing configuration on the remote VTE may entail polling (or submitting a status request to) the remote VTE for status information. In such an embodiment, the remote VTE may respond by issuing a status response indicating the current allocation of computing resources, if any, expended towards the implementation of one or more user configurations.

In Step 522, a determination is made as to whether an existing configuration (i.e., an existing set of one or more user configurations) is implemented on the remote VTE. If it is determined that at least one existing user configuration is implemented on the remote VTE, the process proceeds to Step 524. On the other hand, if it is alternatively determined that no or zero existing user configurations are implemented on the remote VTE, the process proceeds to Step 548 (see e.g., FIG. 5C).

In one embodiment of the invention, each iteration of Steps 524 through 546 (see e.g., FIGS. 5B and 5C) may be performed for each existing user configuration of the set of at least one existing user configuration implemented on the remote VTE. Further, each iteration of Steps 548 through 570 (see e.g., FIGS. 5C and 5D) may be performed for each new user configuration of the set of new user configurations to be implemented on the remote VTE, and specified in the VSC.

Subsequently, in Step 524, after determining (in Step 522) that at least one existing user configuration is implemented on the remote VTE, the remote VTEs manager generates a first drive batch request (DBR). In one embodiment of the invention, the first DBR may include a set or series of one or more tape drive removal requests. The number of tape drive removal requests expressed in the first DBR may equal the number of existing tape drives allocated for the existing user configuration on the remote VTE. For example, if 8 tape drives were allocated, then a set of 8 different tape drive removal requests may be generated to form the first DBR. Further, in one embodiment of the invention, each tape drive removal request may include an existing tape drive ID associated with one existing tape drive of the set of existing tape drives allocated for the existing user configuration.

In Step 526, the remote VTEs manager subsequently provides the first DBR (generated in Step 524) to the remote VTE. In Step 528, after receiving the first DBR from the VTEs manager, the VTE kernel executing on the remote VTE delegates the first DBR to the TDM also executing thereon. Following this, in Step 530, the TDM proceeds to remove the set of existing tape drives allocated for the existing user configuration by processing the set of tape drive removal requests forming the first DBR. In one embodiment of the invention, the TDM may remove the set of existing tape drives (i.e., specified by the existing user specific configuration) by processing each tape drive removal request sequentially. The processing may thus entail: the identification of a set of TDAs associated with the set of existing tape drive IDs specified in the set of tape drive removal requests of the first DBR. In one embodiment of the invention, the TDM may identify each TDA by performing a lookup of the drive control table (DCT) (described above) using each existing tape drive ID. Specifically, the lookup may be performed to identify the TDA ID associated with the TDA responsible for managing one of the existing tape drives of the set of existing tape drives that is to be removed.

In one embodiment of the invention, the processing of the tape drive removal requests by the TDM may further entail: the issuing of a shutdown command to each TDA. In one embodiment of the invention, prior to issuing the shutdown command to each TDA, the TDM may be required to establish a connection with each of the identified TDAs. Each connection may be implemented using any existing inter-process communication mechanism including, but not limited to, the employment of a file transfer, a signal, a socket, a message queue, a pipe, shared memory, message passing, or the sharing of a memory-mapped file. Furthermore, in one embodiment of the invention, each shutdown command may include instructions mandating each TDA to ready the existing tape drive, for which each TDA is responsible, for removal.

In one embodiment of the invention, the processing of the tape drive removal requests may further yet entail: in response to receiving a shutdown command, each identified/existing TDA proceeds to block access to their respective existing tape drive. In one embodiment of the invention, blocking access to a tape drive may entail severing any existing connections between the existing tape drive and the remote mainframe. After successfully blocking access to their respective existing tape drive, each TDA readies their respective existing tape drive for removal. In one embodiment of the invention, readying an existing tape drive may entail cleaning up the existing tape drive, which may include execution of the following processes: (i) the freeing up (or deallocation) of memory allocated to the existing tape drive; (ii) the refreshing of tape library references counter; and (iii) the dumping of statistics related to the existing tape drive. Following the cleanup of their respective existing tape drive, each TDA may set a current usage state of their respective existing tape drive to a dead state, indicative that the respective tape drive is inactive and ready for deletion. Other current usage states that may describe a current status of a tape drive include, but are not limited to, an idle state where the tape drive is neither in-use (or being currently accessed) by at least one user operating the mainframe nor stalled, an in-use state where the tape drive is currently being accessed by at least one user of the mainframe, and a stalled state where the tape drive is non-responsive due to excess activity. In one embodiment of the invention, after readying their respective existing tape drive for deletion, each existing TDA subsequently self-terminates.

Further yet, in one embodiment of the invention, the processing of the tape drive removal requests may additionally entail: based on the dead state of each existing tape drive (partially representative of the existing user configuration), the TDM deletes the set of existing tape drives from the remote VTE. Moreover, the TDM may then update the DCT and/or other data structures to remove mention of the recently deleted existing tape drives and the self-terminated existing TDAs. In one embodiment of the invention, removing mention of each TDA-tape drive pair may at least entail deleting the existing DCT entry in the DCT in which a mapping between the TDA ID associated with one existing TDA and the tape drive ID associated with a corresponding one existing tape drive is stored. After removing mention of each TDA-tape drive pair, the TDM may subsequently issue a request report to the VTE kernel executing on the remote VTE. In one embodiment of the invention, the request report may indicate that the removal of each existing tape drive (per the processing of the set of tape drive removal requests of the first DBR) was successful. Upon receiving the request report (issued by the TDM), the VTE kernel may relay the request report to the remote VTEs manager.

Turning to FIG. 5C, in Step 540, the remote VTEs manager generates a first library batch request (LBR). In one embodiment of the invention, the first LBR may be generated after or in response to the receiving of the successful request report (issued by the TDM) pertaining to the removal of the set of existing tape drives respective to the existing user configuration. Further, in one embodiment of the invention, the first LBR may include a set or series of one or more tape library removal requests. The number of tape library removal requests expressed in the first LBR may equal the number of tape libraries allocated for the existing user configuration on the remote VTE. For example, if 8 tape libraries were allocated, then a set of 8 different tape library removal requests may be generated to form the first LBR. Further, in one embodiment of the invention, each tape library removal request may include an existing tape library ID associated with one existing tape library of the set of existing tape libraries allocated for the existing user configuration.

In Step 542, the remote VTEs manager subsequently provides the first LBR (generated in Step 540) to the remote VTE. In Step 544, after receiving the first LBR from the remote VTEs manager, the VTE kernel executing on the remote VTE delegates the first LBR to the TLM also executing thereon. Following this, in Step 546, the TLM proceeds to remove the set of existing tape libraries by processing the set of tape library removal requests forming the first LBR. In one embodiment of the invention, the TLM may remove the set of existing tape libraries (i.e., specified by the existing user configuration) by processing each tape library removal request sequentially. The processing may thus entail: the identification of a set of existing TLAs associated with the set of existing tape library IDs specified in the set of tape library removal requests of the first LBR. In one embodiment of the invention, the TLM may identify each TLA by performing a lookup of the library control table (LCT) (described above) using each existing tape library ID. Specifically, the lookup may be performed to identify the existing TLA ID associated with the existing TLA responsible for managing one of the existing tape libraries of the set of existing tape libraries that is to be removed.

In one embodiment of the invention, the processing of the tape library removal requests by the TLM may further entail: the issuing of a shutdown command to each existing TLA. In one embodiment of the invention, prior to issuing the shutdown command to each existing TLA, the TLM may be required to establish a connection with each of the existing TLAs. Each connection may be implemented using any existing inter-process communication mechanism including, but not limited to, the employment of a file transfer, a signal, a socket, a message queue, a pipe, shared memory, message passing, or the sharing of a memory-mapped file. Furthermore, in one embodiment of the invention, each shutdown command may include instructions mandating each existing TLA to delete the existing tape library for which each existing TLA is responsible.

In one embodiment of the invention, the processing of the tape library removal requests may further yet entail: in response to receiving a shutdown command, each identified/existing TLA proceeds to delete/remove their respective existing tape library for which the existing TLA is responsible. In one embodiment of the invention, after deleting their respective existing tape library, each existing TLA subsequently self-terminates.

Further yet, in one embodiment of the invention, the processing of the tape library removal requests may additionally entail: the updating of the library control table (LCT) and/or other data structures, by the TLM, to remove mention of the recently deleted existing tape libraries and the self-terminated existing TLAs. In one embodiment of the invention, removing mention of each TLA-tape library pair may at least entail deleting the existing LCT entry in the LCT in which a mapping between the TLA ID associated with one existing TLA and the tape library ID associated with a corresponding one existing tape library is stored. After removing mention of each TLA-tape library pair, the TLM may issue a request report to the VTE kernel executing on the remote VTE. In one embodiment of the invention, the request report may indicate that the removal of each existing tape library (per the processing of the set of tape library removal requests of the first LBR) was successful. Upon receiving the request report (issued by the TLM), the VTE kernel may subsequently relay the request report to the remote VTEs manager.

In Step 548, the remote VTEs manager generates a second LBR. In one embodiment of the invention, the second LBR may be generated after or in response to the receiving of the successful request report (issued by the TLM) pertaining to the removal of the set of existing tape libraries respective to the existing user configuration. In another embodiment of the invention, the second LBR may be generated after determining (in Step 522) that zero existing user configurations are implemented on the remote VTE. Further, in one embodiment of the invention, the second LBR may be generated based on the VSC respective to the remote VTE. In one embodiment of the invention, the second LBR may include a set or series of one or more tape library addition requests. The number of tape library addition requests expressed in the second LBR equals the number of tape libraries specified in the new user specific configuration (i.e., the corresponding user configuration that had been implemented on the corresponding local VTE at the local site). For example, the new user specific configuration may specify the allocation of 16 tape libraries. Accordingly, a set of 16 tape library addition requests may be generated to represent the second LBR. Further, in one embodiment of the invention, each tape library addition request may pertain to the configuration of a different tape library, and thus, may include different library management information (LMI) specific to the tape library associated with the tape library addition request. Each LMI, as discussed above, may include information pertaining to, but not limited to: (i) the storage location in the storage system (see e.g., FIG. 1) wherein tape volume images forming the tape library resides; (ii) the mount point or directory in the VTE wherein the tape library resides; (iii) the classification of the tape library as designated by the requesting entity; (iv) metadata associated with the tape library and/or the contents or data to which the tape library organizes; and (v) a configuration specifying the enablement or disablement of storage system features (e.g., deduplication, replication, encryption, compression, etc.) describing how data organized by the tape library would be stored. Moreover, the LMI for each tape library may be provided by way of the new user specific configuration. In Step 550, the VTEs manager provides the second LBR (generated in Step 548) to the remote VTE.

Turning to FIG. 5D, in Step 560, after receiving the second LBR, the VTE kernel (executing on the remote VTE) delegates the second LBR to the TLM also executing thereon. In one embodiment of the invention, prior to delegating the second LBR, however, the VTE kernel may pause the execution of a library scanning process executing on the remote VTE. The library scanning process may be an instance of a computer program, which may include functionality to monitor the directory in which the various tape libraries (i.e., file systems) are defined. Specifically, the library scanning process monitors the aforementioned directory for changes such as, for example, the addition of new mount points represented by the introduction of new tape volume images (i.e., files or records) in the storage system. Prior to the invention disclosed herein, the detection of a new mount point by the executing library scanning process would trigger the attempted creation of a corresponding tape library without the availability of the necessary LMI, thereby leading to the incorrect configuration of the new mount point. Consequently, to circumvent this dilemma, embodiments of the invention call for the pausing of the library scanning process in order to fulfill the addition of tape libraries properly.

In Step 562, following the pausing of the library scanning process, and after receiving second LBR from the VTE kernel, the TLM proceeds to create a set of new tape libraries by processing the set of tape library addition requests forming the second LBR. In one embodiment of the invention, the TLM may create the set of new tape libraries by processing each tape library addition request sequentially. The processing of each tape library addition request may entail the instantiation of a new tape library in accordance with the configuration information presented in the respective LMI included in the tape library addition request.

In one embodiment of the invention, processing of the second LBR may further entail: after creating each new tape library through the processing of each tape library addition request in the second LBR, the TLM may update the LCT (described above) and/or other data structures to include mention of the newly created tape libraries. In one embodiment of the invention, the TLM may further update at least the LCT to include mention of a set of new TLAs, which have yet to be created. These new TLAs would each include functionality to manage one of the newly created tape libraries. In one embodiment of the invention, updating the LCT may entail creating a new LCT entry in the LCT for each new tape library and new TLA pair. Further, each new LCT entry may at least contain a mapping relating one new tape library to one new TLA. More specifically, each new LCT entry may contain a new tape library ID associated with a new tape library and a new TLA ID associated with a yet to be created new TLA.

In one embodiment of the invention, processing of the second LBR may further yet entail: after updating the LCT, the TLM creates the set of new TLAs mentioned above. In one embodiment of the invention, creation of each new TLA may entail the instantiation of a new computer program instance, which is subsequently provided at least a portion of the LMI (i.e., the configuration information) respective to the new tape library that the new TLA will be managing. Further, in one embodiment of the invention, after creating the new TLAs, the TLM may resume the library scanning process executing on the remote VTE.

Further yet, in one embodiment of the invention, the TLM may issue a request report to the VTE kernel executing on the remote VTE. In one embodiment of the invention, the request report may indicate that the addition of each new tape library, per the set of tape library addition requests, and subsequently, the fulfillment of the second LBR, was successful. Moreover, upon receiving the request report, the VTE kernel may relay the request report to the remote VTEs manager.

In Step 564, the remote VTEs manager generates a second DBR based on the VSC respective to the remote VTE. In one embodiment of the invention, the second DBR may be generated after or in response to the receiving of the successful request report (issued by the TLM) pertaining to the addition of the set of new tape libraries respective to the new user configuration. Further, in one embodiment of the invention, the second DBR may include a set or series of one or more tape drive addition requests. The number of tape drive addition requests expressed in the second DBR equals the number of tape drives specified in the new user configuration (i.e., the corresponding user configuration that had been implemented on the corresponding local VTE at the local site). For example, the new user specific configuration may request the allocation of 16 tape drives. Accordingly, a set of 16 tape drive addition requests may be generated to represent the second DBR. Further, in one embodiment of the invention, each tape drive addition request may pertain to the configuration of a different tape drive, and thus, may include a different tape drive configuration (TDC) specific to the tape drive associated with the tape drive addition request. Each TDC, as discussed above, may include, but is not limited to: (i) a tape library ID associated with a virtual tape library to which the virtual tape drive points (i.e., accesses); (ii) a media access control (MAC) address and/or Internet Protocol (IP) address assigned to the virtual tape drive; (iii) drive type information detailing the specifications for the physical tape drive model the virtual tape drive is to be emulating; and (iv) a set of parameters defining the behavior of the virtual tape drive.

In Step 566, the remote VTEs manager provides the second DBR to the remote VTE. In Step 568, after receiving the second DBR from the VTEs manager, the VTE kernel executing on the remote VTE delegates the second DBR to the TDM also executing thereon. In Step 570, after obtaining the second DBR, the TDM proceeds to create a set of new tape libraries by processing the second DBR. In one embodiment of the invention, processing the second DBR may entail: updating the DCT and/or other data structures to include mention of a yet to be created set of new tape drives. In one embodiment of the invention, the TDM may further update the DCT to include mention of a yet to be created set of new TDAs, wherein each new TDA would include functionality to manage one of the yet to be created new tape drives. Further, updating the DCT may entail creating a new DCT entry in the DCT for each yet to be created new tape drive. Each new DCT entry may at least contain a mapping relating one new tape drive to a new TDA. More specifically, each new DCT entry may contain a new tape drive ID associated with a new tape drive and a new TDA ID associated with a corresponding new TDA.

In one embodiment of the invention, processing of the second DBR may further entail: after updating the DCT, the TDM proceeds to create the set of new tape drives per the set of tape drive addition requests forming the second DBR. In one embodiment of the invention, the TDM may create the set of tape drives by processing each tape drive addition request sequentially. The processing of each tape drive addition request may entail the instantiation (or emulation) of a new tape drive in accordance with the configuration information presented in the respective TDC included in the tape drive addition request.

In one embodiment of the invention, processing of the second DBR may further yet entail: after creating each new tape drive through the processing of each tape drive addition request in the second DBR, the TDM creates the set of new TDAs mentioned above. In one embodiment of the invention, creation of each new TDA may entail the instantiation of a new computer program instance, which is subsequently provided at least a portion of the TDC (i.e., the configuration information) respective to the new tape drive that the new TDA will be managing. In one embodiment of the invention, after creating each new TDA, the TDM establishes a set of connections between the remote mainframe and each newly created tape drive. Establishing the set of connections may entail, for example, the allocation of one or more fibre connection (FICON) ports on the remote VTE, which operatively connect the remote VTE to the remote mainframe, to each of the newly created tape drives.

Further yet, in one embodiment of the invention, the TDM may issue a request report to the VTE kernel. In one embodiment of the invention, the request report may indicate that the addition of each new tape drive, per the set of tape drive addition requests, and subsequently, the fulfillment of the second DBR, was successful. Moreover, upon receiving the request report, the VTE kernel may relay the request report to the remote VTEs manager.

From here, and though not illustrated, the remote VTEs manager receives the successful request report (issued by the TDM) pertaining to the addition of the set of new tape drives respective to the new user configuration. Moreover, after receiving the aforementioned successful request report indicating the implementation of the last VSC on the last remote VTE, the remote VTEs manager may issue a response to the submitting of the set of VSCs by the remote DRM (in Step 510). In one embodiment of the invention, the response may indicate that processing, and thus, fulfillment, of each VSC of the set of VSCs was successful. In turn, upon receiving the response from the remote VTEs manager, the remote DRM may update the configurations repository by: (i) deleting the set of local DRCs stored in the local section of the configurations repository; (ii) adding the latest remote DRC (obtained in Step 506) as a first/latest local DRC in the recently emptied local section of the configurations repository; and (iii) deleting the set of remote DRCs stored in the remote section of the configurations repository.

Figure 6A:
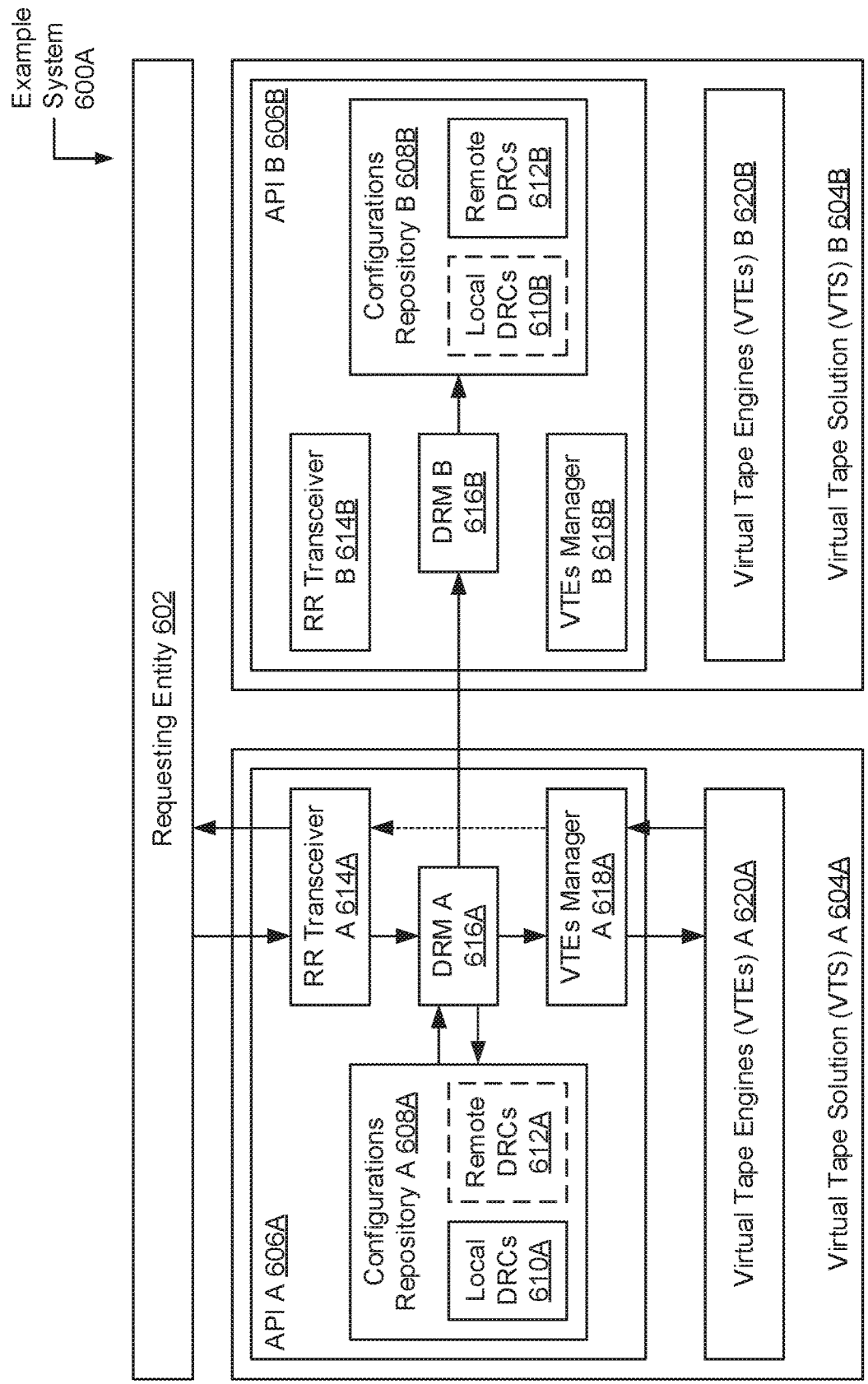
FIGS. 6A and 6B show example systems in accordance with one or more embodiments of the invention.
Figure 6B:
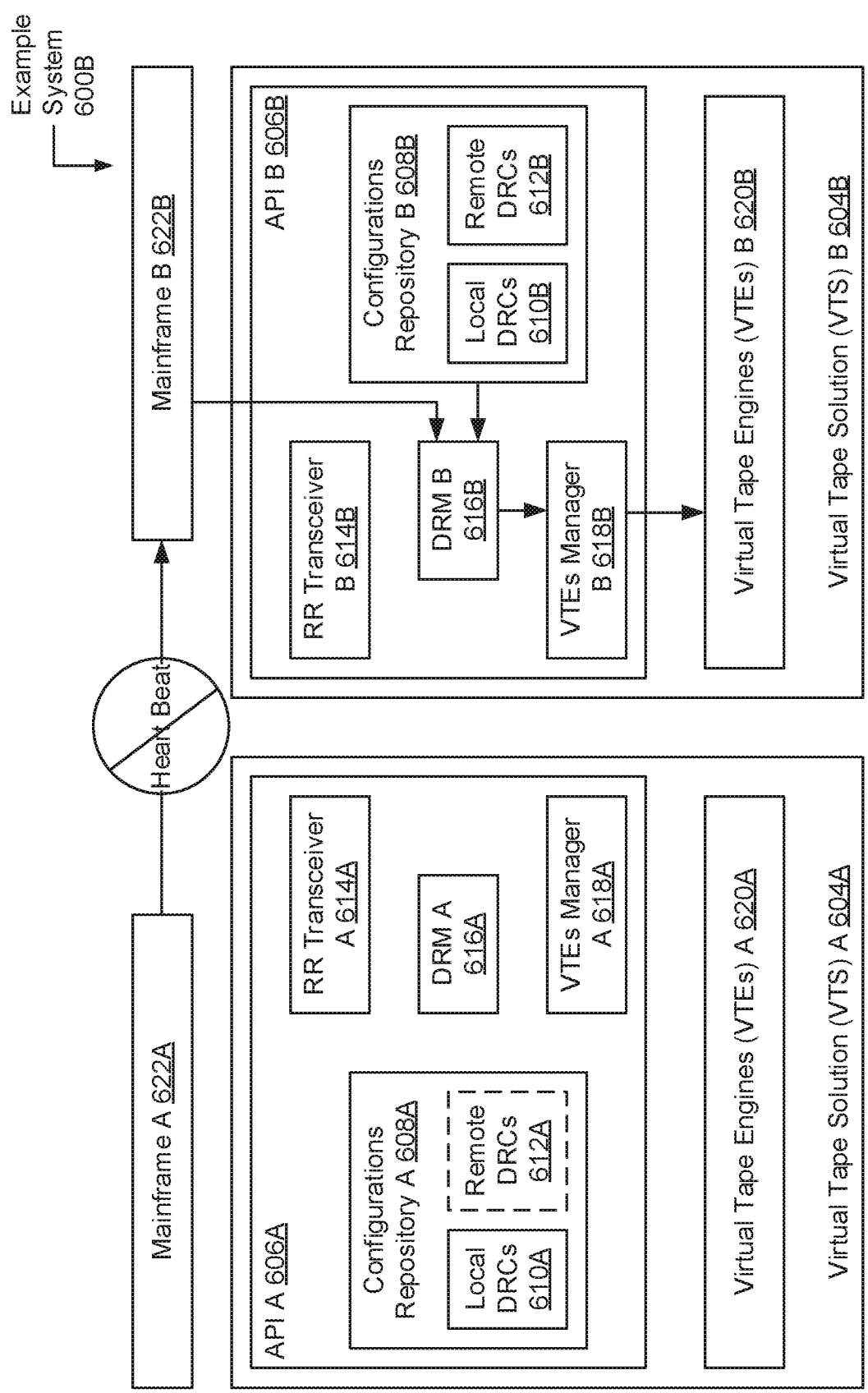

FIGS. 6A and 6B show example systems in accordance with one or more embodiments of the invention. The following example, presented in conjunction with components shown in FIGS. 6A and 6B, is for explanatory purposes only and not intended to limit the scope of the invention.

Turning to FIG. 6A, the example system (600A) includes a requesting entity (602) operatively connected to a first or local VTS (604A). The local VTS (604A) includes a local VTS API (606A) and a set of local VTEs (620A). The local VTS API (606A) includes: (i) a local configurations repository (608A), which stores a set of local DRCs (610A); (ii) a local request-response transceiver (614A) communicatively connected with the requesting entity (602); (iii) a local DRM (616A) communicatively connected with one or more other components of the local VTS API (606A) as well as a remote DRM (616B); and (iv) a local VTEs manager (618A) communicatively connected with one or more other components of the local VTS API (606A) as well as the set of local VTEs (620A). The example system (600B) further includes a second or remote VTS (604B). Similar to the configuration of the local VTS (604B), the remote VTS (604B) includes a corresponding remote VTS API (606B) and a set of remote VTEs (620B). The remote VTS API (606B) subsequently includes: (i) a remote configurations repository (608B), which stores a set of remote DRCs (612B) (i.e., local DRCs of the local VTS (604A) shared by the local DRM (616A)); (ii) a remote request-response transceiver (614B) that is inactive; (iii) a remote DRM (616B) communicatively connected to the remote configurations repository (608B), a remote mainframe (not shown), and the local DRM (616A); and (iv) a remote VTEs manager (618B) communicatively connected to the remote DRM (616B) and the set of remote VTEs (620B).

Turning to the example, consider a scenario whereby, prior to a failover event occurring, the requesting entity (602) submits a user request to the local VTS (604A). Accordingly, the user request may be received by the local VTS API (606A), or more specifically, the local request-response transceiver (614A) executing therein. The user request may specify a user ID—e.g., "user 0123", and a user configuration. The user configuration may specify at least the following information: (i) a set of new library management information (LMI) used to configure a set of new virtual tape libraries; (ii) a cardinality of the set of new LMI; (iii) a set of new tape drive configurations used to configure a set of new virtual tape drives; and (iv) a cardinality of the set of new tape drive configurations. The user request may further include a VTE ID—e.g., "vtex", associated with a local VTE of the set of local VTEs (620A).

Upon receiving the user request from the requesting entity (602), the local request-response transceiver (614A) provides the user ID and the user configuration to the local DRM (616A). The local DRM (616A), in turn, generates a new latest local DRC by updating a duplicate recently stored local DRC with changes introduced by the user configuration. After creating the new latest local DRC, the local DRM (616A) stores the new latest local DRC amongst the local DRCs (610A) in the local configurations repository (608A). After the storing, the local DRM (616A) shares the new latest local DRC with the remote DRM (616B), whereby the remote DRM (616B) receives the new latest local DRC from the local DRM (616A) and subsequently, stores the new latest local DRC as a latest remote DRC amongst the remote DRCs (612B) in the remote configurations repository (608B). After sharing the new latest local DRC, the local DRM (616A) provides the user ID and the user configuration (received alongside the user request) to the local VTEs manager (618A) for implementation of the user configuration on the local VTE (associated with the VTE ID included in the user request) of the set of local VTEs (620A).

Turning to FIG. 6B, the example system (600B) is lightly modified, and rather than the requesting entity (602), portrays a first or local mainframe (622A) operatively connected to a second or remote mainframe (622B). Further, the remote mainframe (622A) is communicatively connected to the remote DRM (616B).

Proceeding with the example, during or after a failover event is occurring on the local mainframe (620A), the heartbeat generated by the local mainframe (620A) ceases to reach the remote mainframe (620B). In response to not detecting the aforementioned heartbeat over a period of time, the remote mainframe (620B) generates/issues a configuration override instruction to the remote DRM (616B). In response to the configuration override instruction, the remote DRM (616B) obtains the latest remote DRC (amongst the set of remote DRCs (612B)) from the remote configurations repository (608B). After obtaining the latest remote DRC, the remote DRM (616B) segments the latest remote DRC to define a set of VSCs, and subsequently, provides the set of VSCs to the remote VTEs manager (618B). The remote VTEs manager (618B) then generates, for each VSC and for each user configuration existing on a respective remote VTE and/or specified in the VSC, a set of DBRs and a set of LBRs based on the respective VSC. The set of DBRs and the set of LBRs are then delegated to the respective remote VTE (of the set of remote VTEs (620B)).

The set of DBRs may include: (i) a first DBR including a set of tape drive removal requests, which when processed by the respective remote VTE, removes any and all existing tape drives and TDAs implemented on the respective remote VTE for the existing user configuration thereon; and (ii) a second DBR including a set of tape drive addition requests, which when processed by the respective remote VTE, creates a set of new tape drives and TDAs representative of the allocation of computing resources to implement a new user configuration specified in the VSC directed to the respective remote VTE.

The set of LBRs may include: (i) a first LBR including a set of tape library removal requests, which when processed by the respective remote VTE, removes any and all existing tape libraries and TLAs implemented on the respective remote VTE for the existing user configuration thereon; and (ii) a second LBR including a set of tape library addition requests, which when processed by the respective remote VTE, creates a set of new tape libraries and TLAs representative of the allocation of computing resources to implement a new user configuration specified in the VSC directed to the respective remote VTE.

Figure 7:
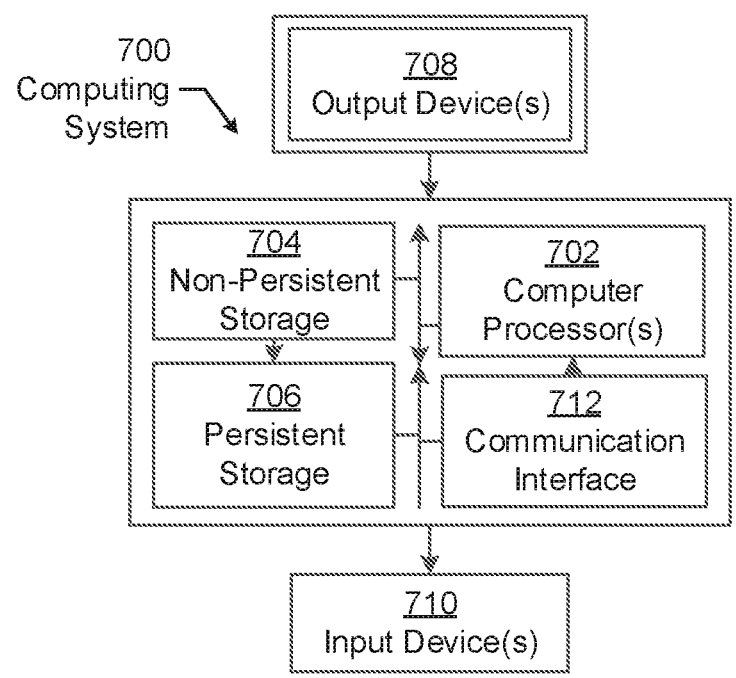
FIG. 7 shows a computing system in accordance with one or more embodiments of the invention.

Embodiments of the invention may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Embodiments of the invention provide a mechanism for disaster recovery configurations and management in virtual tape applications. The mechanism introduces an automated solution to a process that is presently performed manually by network, datacenter, and/or mainframe administrators, which tends to be error prone. In contrast, one or more embodiments of the invention enable the automatic updating and transferring of disaster recovery configurations towards the mitigation of failover events, thereby providing a non-disruptive, fast, and cheap ability for administrators and users to move workload.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for mitigating disaster recovery in virtual tape applications, comprising:
receiving, by a first virtual tape solution (VTS), a configuration override instruction from a first mainframe;
obtaining, in response to the receiving, a disaster recovery configuration (DRC) from a configurations repository, wherein the DRC is a latest global configuration implemented on a second VTS prior to a failover event occurring on a second mainframe; and
processing the DRC to configure a set of virtual tape engines (VTEs) of the first VTS, wherein, for each VTE of the set of VTEs, processing the DRC comprises:
segmenting a portion of the DRC to define a VTE specific configuration (VSC), and
generating, based on a first portion of the VSC, a first library batch request (LBR) comprising a set of tape library addition requests.

2. The method of claim 1, wherein the configuration override instruction comprises a command for the first VTS to utilize the DRC.

3. The method of claim 2, wherein the DRC replaces an existing global configuration of the first VTS.

4. The method of claim 1, wherein processing the DRC further comprises:
processing the first LBR to create a first set of virtual tape libraries.

5. The method of claim 4, wherein processing the DRC further comprises:
generating, based on a second portion of the VSC, a first drive batch request (DBR) comprising a set of tape drive addition requests.

6. The method of claim 4, wherein processing the first LBR to create the first set of virtual tape libraries, comprises:
for each virtual tape library of the first set of virtual tape libraries:
extracting, from one tape library addition request of the set of tape library addition requests, library management information (LMI);
creating the virtual tape library using the LMI; and
creating, based on at least a portion of the LMI, a tape library agent (TLA) to manage the virtual tape library.

7. A system, comprising:
a first mainframe;
a set of virtual tape engines (VTEs) operatively connected to the first mainframe; and
a first disaster recovery manager (DRM) operatively connected to the first mainframe, and programmed to:

receive, by a first virtual tape solution (VTS), a configuration override instruction from the first mainframe;

obtain, in response to the receiving, a disaster recovery configuration (DRC) from a configurations repository, wherein the DRC is a latest global configuration implemented on a second VTS prior to a failover event occurring on a second mainframe; and process the DRC to configure the set of VTEs, wherein, for each VTE of the set of VTEs, processing the DRC comprises:

segment a portion of the DRC to define a VTE specific configuration (VSC), and generating, based on a first portion of the VSC, a first library batch request (LBR) comprising a set of tape library addition requests.

8. The system of claim 7, wherein the configuration override instruction comprises a command for the first VTS to utilize the DRC.

9. The system of claim 8, wherein the DRC replaces an existing global configuration of the first VTS.

10. The system of claim 7, wherein processing the DRC further comprises:

processing the first LBR to create a first set of virtual tape libraries.

11. The system of claim 10, wherein processing the DRC further comprises:

generating, based on a second portion of the VSC, a first drive batch request (DBR) comprising a set of tape drive addition requests.

12. The system of claim 11, wherein processing the DRC further comprises:

processing the first DBR to create a first set of virtual tape drives.

13. The system of claim 10, wherein processing the first LBR to create the first set of virtual tape libraries, comprises:

for each virtual tape library of the first set of virtual tape libraries:

extracting, from one tape library addition request of the set of tape library addition requests, library management information (LMI);

creating the virtual tape library using the LMI; and creating, based on at least a portion of the LMI, a tape library agent (TLA) to manage the virtual tape library.

14. A non-transitory computer readable medium comprising instructions which, when executed by a computer processor, enables the computer processor to perform a method for mitigating disaster recovery in virtual tape applications, the method comprising:

receiving, by a first virtual tape solution (VTS), a configuration override instruction from a first mainframe;

obtaining, in response to the receiving, a disaster recovery configuration (DRC) from a configurations repository, wherein the DRC is a latest global configuration implemented on a second VTS prior to a failover event occurring on a second mainframe; and processing the DRC to configure a set of virtual tape engines (VTEs) of the first VTS, wherein, for each VTE of the set of VTEs, processing the DRC comprises:

segmenting a portion of the DRC to define a VTE specific configuration (VSC), and generating, based on a first portion of the VSC, a first library batch request (LBR) comprising a set of tape library addition requests.

15. The non-transitory computer readable medium of claim 14, wherein the configuration override instruction comprises a command for the first VTS to utilize the DRC.

16. The non-transitory computer readable medium of claim 15, wherein the DRC replaces an existing global configuration of the first VTS.

* * * * *